Patented June 24, 1930

1,765,680

UNITED STATES PATENT OFFICE

HANS KRZIKALLA, OF MANNHEIM, GERMANY, ASSIGNOR TO GENERAL ANILINE WORKS, INC., OF NEW YORK, N. Y., A CORPORATION OF DELAWARE

PRODUCTION OF COMPLEX METAL COMPOUNDS OF O-HYDROXYAZO DYESTUFFS

No Drawing. Application filed August 27, 1927, Serial No. 215,998, and in Germany August 28, 1926.

Hitherto it has been the practice, in the production of complex metal compounds of o-hydroxyazo dyestuffs, to employ the o-hydroxyazo dyestuffs themselves as initial materials.

I have now found that derivatives of o-hydroxyazo dyestuffs which contain oxalkyl groups, instead of the hydroxyl groups, in the o-position in relation to the azo group, may be employed, these derivatives being treated with metal compounds capable of giving rise to complex compounds with o-hydroxy-azo dyestuffs, and the treatment being carried out under conditions in which the alkyl groups are split off. For example, the alkyl groups may be split off by heating the dyestuffs with the metal compounds in the presence of water, at temperatures above 100° C. and under elevated pressure. In many instances even a prolonged boiling of the mixture under ordinary pressure under a reflux condenser is sufficient. According to this manner of working the same complex metal compounds of o-hydroxyazo dyestuffs are obtained as when the corresponding o-hydroxyazo dyestuffs which are not substituted in the hydroxyl groups, are employed. The process herein described possesses the advantage that, in many instances, owing to the considerably superior coupling capacity of the diazotized oxalkylated aromatic amines, the initial dyestuffs may be obtained with higher yield and in greater purity than the corresponding o-hydroxyazo dyestuffs prepared from the far less quickly coupling diazo compounds of o-amino-phenols.

The following examples will further illustrate the nature of the said invention but the invention is not limited thereto. The parts are by weight.

Example 1

41 parts of the azo dyestuff obtainable from diazotized 4-chlor-2-anisidine and 2.6-naphthol-sulfonic acid, are heated under pressure for from 7 to 8 hours with 600 to 700 parts of water, 40 parts of an aqueous chromium hydroxid paste containing 26 per cent of $Cr_2O_3$ and 20 to 25 parts of 85 per cent formic acid at from 125 to 130° C., in the autoclave. The resulting complex chromium compound is then salted out as usual and filtered by suction. It gives violet dyeings, fast to washing, milling and light, on wool, whereas the initial dyestuff gives a pale red dyeing which is far inferior in respect of fastness.

The reaction described in this example may be represented by the following formulae:

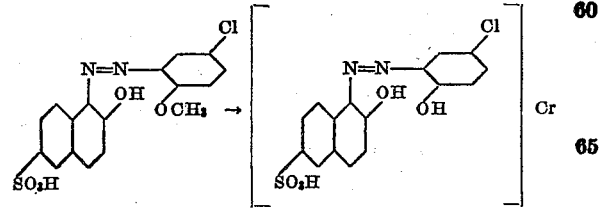

Example 2

42 parts of the azo dyestuff obtainable from diazotized 4-nitro-2-anisidine and 2.6-naphtholsulfonic acid are heated at 120° C. in an autoclave for about 3 hours with 500 to 600 parts of water and 22 parts of copper formate. On salting-out, a complex copper compound is obtained which gives fast Bordeaux red dyeings on wool, whereas the initial dyestuff gives yellowish-red dyeings.

If the same initial dyestuff be treated in the manner described in Example 1, with a trivalent chromium salt, the corresponding complex chromium compound is formed, which gives fast brownish violet dyeings on wool.

Other azo dyestuffs with nitroanisidines as diazo components, can be chromed in a similar manner. Thus, for example, the violet-red azo dyestuff obtainable from diazotized 5-nitro-2-anisidine and 2.6 naphthol-sulfonic acid, furnishes when chromed a chromium compound which dyes green. The most suitable conditions for the chroming process must be ascertained by trial in each case.

*Example 3*

35 parts of the azo dyestuff obtainable from diazotized 2-amino-anisol-4-sulfonic acid and β-naphthol are heated at from 125 to 130° C. in the autoclave for 7 hours, with the same amounts of water, chromium hydroxid and formic acid as indicated in Example 1. A violet chromium compound is obtained, the initial dyestuff being red.

The formation of the complex metal compound described in this example, may be represented by the following formulæ:

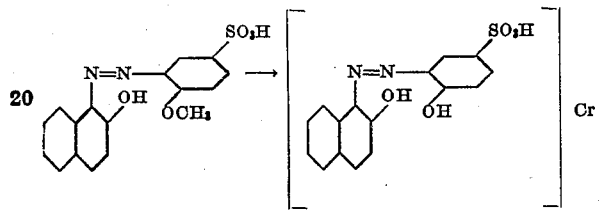

*Example 4*

38 parts of the azo dyestuff obtainable from diazotized o-phenetidine and 1.5-naphtholsulfonic acid are heated at from 125 to 130° C. in the autoclave for from 7 to 8 hours, with 400 parts of water, 40 parts of an aqueous paste of chromium hydroxid containing 26 per cent of $Cr_2O_3$ and 20 to 25 parts of 85 per cent formic acid. After salting-out as usual, a violet chromium compound is obtained, which has the same properties as the corresponding chromium compound prepared from the azo dyestuff from diazotized o-aminophenol and 1.5-naphtholsulfonic acid. Whereas, however, the initial dyestuff used in the latter case can only be obtained with low yield and in an impure condition, the analogous dyestuff with o-phenetidine as diazo component is easily obtained pure and in almost quantitative yield.

The formation of this dyestuff may be represented by the following formulæ:

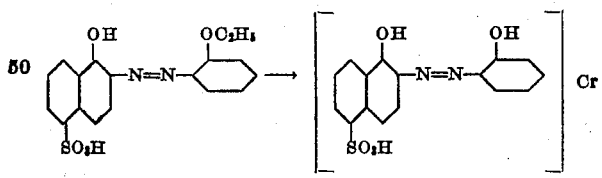

The chroming of the azo dyestuff from diazotized o-phenetidine and 1.5-naphtholsulfonic acid may also be effected, for example, with chromium fluoride and prolonged boiling under a reflux condenser.

*Example 5*

28 parts of the red pigment dyestuff obtainable from the diazo compound of o-anisidine and β-naphthol are heated at from 125 to 130° C. for about 7 to 8 hours in an autoclave with 600 parts of ethyl alcohol and 160 parts of an aqueous solution of chromium formate containing about 40 parts of chromium hydroxid with 26 per cent of $Cr_2O_3$ and 25 parts of 85 per cent formic acid. On the addition of water, a violet chromium compound is precipitated, which is filtered by suction and washed with water. The initial dyestuff is easily obtainable in a pure state and with almost quantitative yield.

What I claim is:

1. The process of producing complex metal compounds of o-hydroxy-azo-dyestuffs, which comprises treating azo-dyestuffs, which contain an oxalkyl group in ortho-position to the azo group, with metal compounds capable of giving rise to complex compounds with o-hydroxy-azo-dyestuffs, the treatment being carried out under conditions, in which the alkyl groups contained in the oxalkyl groups are split off.

2. The process of producing complex metal compounds of o-hydroxy-azo-dyestuffs, which comprises heating azo-dyestuffs, which contain an oxalkyl group in ortho position to the azo group, with metal compounds capable of giving rise to complex compounds with o-hydroxy-azo-dyestuffs, in the presence of water at temperatures above 100° C.

3. The process of producing complex chromium compounds of o-hydroxy-azo-dyestuffs, which comprises heating azo-dyestuffs, which contain an oxalkyl group in ortho-position to the azo group, with chromium compounds capable of giving rise to complex compounds with o-hydroxy-azo-dyestuffs, in the presence of water at temperatures above 100° C.

4. The process of producing complex metal compounds of o-hydroxy-azo-dyestuffs, which comprises treating such azo-dyestuffs as are obtainable by coupling diazotized amines containing an oxalkyl group in ortho-position to the amino group, with naphthol sulfonic acids with metal compounds capable of giving rise to complex compounds with o-hydroxy-azo-dyestuffs, the treatment being carried out under conditions, in which the alkyl groups contained in the oxalkyl groups are split off.

5. The process of producing complex metal compounds of o-hydroxy-azo-dyestuffs, which comprises treating such azo-dyestuffs as are obtainable by coupling diazotized amines containing an oxalkyl group in ortho-position to the amino group, with 2.6-naphthol sulfonic acid, with metal compounds capable of giving rise to complex compounds with o-hydroxy-azo-dyestuffs, in the presence of water at temperatures above 100° C.

6. The process of producing complex metal compounds of o-hydroxy-azo-dyestuffs, which comprises heating the azo dyestuff obtainable by coupling diazotized 4-chlor-2-anisidine and 2.6-naphthol sulfonic acid, with metal compounds capable of giving rise to complex compounds with o-hydroxy-azo-dyestuffs, in the presence of water at temperatures above 100° C.

7. The process of producing complex metal compounds of o-hydroxy-azo-dyestuffs, which comprises heating the azo dyestuff obtainable by coupling diazotized 4-chlor-2-anisidine and 2.6-naphthol sulfonic acid, with chromium formate at temperatures of 125° to 130° C. under an elevated pressure.

In testimony whereof I have hereunto set my hand.

HANS KRZIKALLA.